United States Patent [19]
Hodlewsky

[11] Patent Number: 4,586,601
[45] Date of Patent: May 6, 1986

[54] MAGNETIZED CONVEYOR AND CHAIN LINKS

[75] Inventor: Wasyly G. Hodlewsky, Greendale, Wis.

[73] Assignee: Rexnord Inc., Brookfield, Wis.

[21] Appl. No.: 191,477

[22] Filed: Sep. 26, 1980

[51] Int. Cl.[4] ............................................. B65G 17/46
[52] U.S. Cl. .................................. 198/690.1; 198/853
[58] Field of Search ....................... 198/690, 850–853, 198/690.1; 335/302, 303

[56] References Cited

U.S. PATENT DOCUMENTS

| | | | |
|---|---|---|---|
| 2,806,396 | 9/1957 | Miller | 198/690 X |
| 2,911,091 | 11/1959 | Imse | 198/853 |
| 3,669,247 | 6/1972 | Pulver | 198/852 X |
| 3,871,510 | 3/1975 | Homeier | 198/690 |
| 3,992,689 | 11/1976 | Kaplow | 335/302 |

FOREIGN PATENT DOCUMENTS 1127795 4/1962 Fed. Rep. of Germany .
945887 1/1964 United Kingdom .

*Primary Examiner*—Jeffrey V. Nase
*Attorney, Agent, or Firm*—Richard C. Ruppin

[57] ABSTRACT

A magnetic conveyor including chain links with article carrying portions having magnetized grommets or magnetic filler material dispersed throughout to impart magnetic properties to the conveyor chain for conveying ferro magnetic articles. Preferably, the chain links comprise a polymeric resin material with a magnetic filler material dispersed therein during the molding process. Magnetization to provide multiple poles allows a minimum amount of filler material to be used thereby resulting in a relatively small reduction in the strength of the chain.

3 Claims, 9 Drawing Figures

MAGNETIZED CONVEYOR AND CHAIN LINKS

BACKGROUND OF THE INVENTION

The present invention relates to magnetic conveyor chain of the type used to convey articles in a path that may include inclines and more particularly to nonmetallic magnetized chain or roller chain having nonmetallic magnetized snap-on top plates used for these purposes.

In many industrial applications it is often desirable to convey articles from one location to another by means of a travelling article carrying conveyor chain which supports the articles being conveyed. In situations requiring the transport of relatively tall articles it is often necessary to stabilize the products on the conveyor chain by using attachments to the chain which support the conveyed products and minimize the possibility of product tippage. Similarly, in situations requiring the transport of articles up or down an incline it is typically necessary to provide conveyor chain attachments of one type or another to prevent the conveyed products from slipping on the inclined portion of the conveyor.

Products being conveyed may be of several different types and made of various materials. In those circumstances where products are made from ferro magnetic materials attempts have been made to provide some type of magnetic attraction between the products and the conveyor. Generally, prior attempts to provide this magnetic attraction have included mounting magnets beneath the conveyor chain to establish a magnetic field in the area above the conveyor chain where the transported products are located. While being relatively successful as far as improving the stability of the products of the conveyors in both horizontal and inclined situations, these previous attempts have several serious drawbacks. Provision of magnets beneath the conveyor chain results in the chain being pulled toward its wear strips by attraction of the product through the chain. This increases the frictional drag of the chain on the wear strips resulting in increased wear of the chain links and other conveyor members and increased power requirements to drive the chain. Also, pulsation of the conveyor has resulted in these systems. These prior attempts have also proved to be very expensive.

Additionally, other attempts such as that shown in U.S. Pat. No. 3,871,510 have included attachment of magnets to the article carrying portion of the conveyor links to impart magnetic properties to the links. These attempts suffer from the drawbacks of being time consuming and difficult to assemble and also require storage of many additional component parts.

SUMMARY OF THE INVENTION

The conveyor and chain link of the present invention overcome the drawbacks associated with presently known magnetic conveyors by including chain links with magnetized article carrying portions providing the requisite magnetic field to attract the conveyed products to the chain without increasing the frictional drag of the chain on the conveyor wear strips. According to the present invention a plurality of chain links are connected together in a conventional manner to form a conveyor. The links in which it is desired to produce a magnetic field for attracting conveyed products have magnetized particles or inserts in at least the article carrying portion of the conveyor.

In one embodiment the relatively flat article carrying top portions of the selected links have at least one hole into which a magnetized grommet is placed to provide the required attractive force. The grommet can be made from a polymeric material that is injection molded to the appropriate size and shape to fit the hole in the chain link. Preferably, the grommet comprises a polymeric resin containing a ferro magnetic filler such as barium-ferrite in sufficient quantity to provide the desired magnetic characteristics.

In another embodiment wherein the entire article carrying portion of the chain link itself is made of a polymeric material it may be more beneficial and advantageous from a manufacturing standpoint to include the ferro magnetic filler during the molding process of the article carrying portion itself to provide the necessary magnetic characteristics in a given individual application. It is also preferable to magnetize these particles in such a manner that a plurality of magnetic poles are established in the article carrying portion of the conveyor links to increase the magnetic field strength. Although one embodiment of the present invention can be used with metallic as well as nonmetallic links, nonmetallic links are preferred. Nonmetallic chain protects the conveyed articles from damage that can be caused by articles sliding along the chain during conveying.

Regardless of the method used to impart the magnetic properties to the chain links, the resulting conveyor offers substantial advantages. As previously mentioned, frictional drag of the conveyor links against the conveyor wear strips is not increased because no additional forces are exerted on the links. Additionally, means for selectively neutralizing the magnetic field around the links as they pass a transfer point along the conveyor may be provided to more easily strip the products from the conveyor. However, stripping of products from the conveyor can also be accomplished without neutralizing the magnetic field because less force is required to slide the product off the conveyor than is required to lift the product from the conveyor.

Another benefit possible in a conveyor constructed of chain links having magnetic inserts is to convey articles up and down relatively steep inclines without the use of special attachments of the chain links. In such applications the conveyor chain has a tendency to raise as it makes the transition from its horizontal to inclined path. To counteract this tendency the portions of the wear strip at the junction where the conveyor chain tends to raise may comprise a ferro magnetic strip to attract the chain to the strip thereby reducing the tendency of the chain to raise from its track.

A more thorough understanding of the present invention will be gained by reading the following description of the preferred embodiments with reference to the accompanying drawings in which:

FIG. 1 is a perspective view of one embodiment of a chain link constructed according to the principles of the present invention, FIG. 2 is a side view along line 2—2 of the chain link of FIG. 1, FIG. 3 is a perspective view of another embodiment of a chain link constructed according to the principles of the present invention, FIG. 4 is a side view of a conveyor constructed according to the principles of the present invention using the chain links of FIG. 1, FIG. 5 is a top view of the conveyor of FIG. 4, FIG. 6 is a side view of an inclined conveyor constructed in accordance with the principles of the present invention, FIG. 7 is a perspective view of another embodiment of the present invention used with a snap-on attachment, FIG. 8 is a sectional view taken along the section 8—8 of FIG. 7, and FIG. 9 is a perspective view of another embodiment of the present invention, illustrating a snap-on attachment.

DETAILED DESCRIPTION OF THE PREFERRED EMBODIMENT

Figure 1:
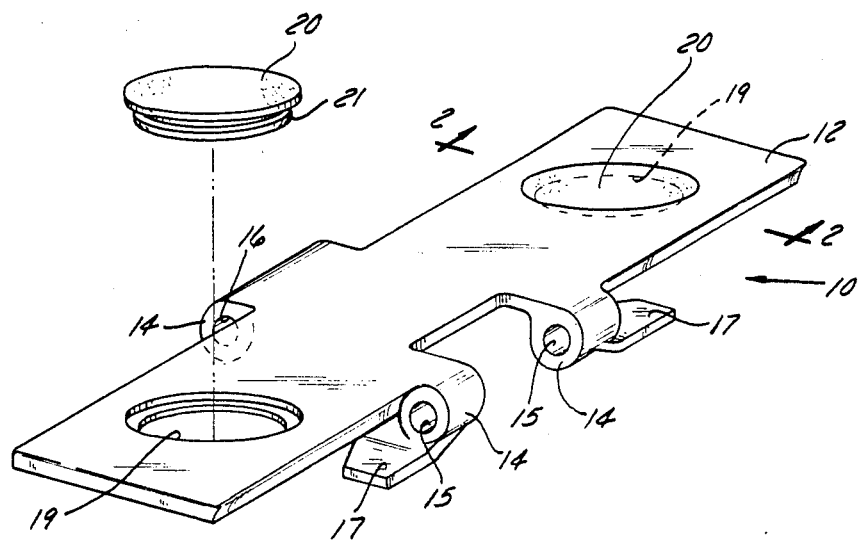
Figure 2:
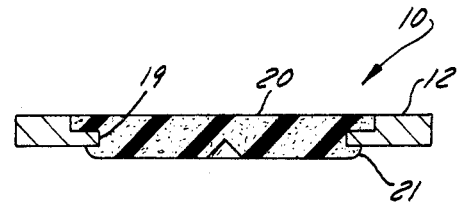

Referring now to FIG. 1, there is shown a chain link 10 of known configuration employing the principles of the present invention. The chain link 10 includes an article carrying portion 12 and two legs 14, integrally depending therefrom, connecting the eyes 15 of the link. The two holes 15 at the leading edge and one eye 16 at the trailing edge of the link 10 are formed so that the trailing eye 16 of one link 10 fits between the two eyes 15 on the leading edge of an adjacent link 10 to form a conveyor chain by connecting adjacent links 10 with chain pins in a conventional manner. The depending legs 14 preferably have outwardly extending projections or tabs 17 to engage wear strips on which the chain is supported in the conveying operation.

The material from which the chain links 10 are made varies depending upon the environment in which the conveyor will operate. In many applications, metallic links are preferable while in other applications nonmetallic or polymeric links are preferred. The present invention maybe utilized with either type of link material. Additionally, snap-on top plates for attachment to a conventional roller chain may be magnetized in accordance with the principles of the present invention.

The chain link 10 of FIG. 1 is shown as having two holes 19 in its article carrying portion 12. In each aperture 19 there is a magnetized grommet 20. The apertures 19 have a varying internal diameter. The grommets 20 are constructed with a varying outside diameter which permits the grommets to be placed in the holes 19 and locked in place. In the embodiment shown each grommet includes a large top surface, a smaller diameter central portion, and a sectioned tab portion 21 that is larger than the smallest internal diameter of aperture 19. When the grommet 20 is inserted into aperture 19, the tab portion 21 is radially compressed until it passes through the smallest internal diameter portion of aperture 19. When the large diameter bottom portion 21 of the grommet 20 has passed through the smallest part of hole 19, the tabs 21 return to their normal position. Thus, the grommet 20 is secured in position by its large top and bottom portions, both of which are larger than the smallest diameter portion of aperture 19. While the link 10 shown has two grommets 20, any desired number may be used.

The holes 19 in the article carrying portion 12 of the links 10 are recessed near the upper surface of the link 10 so that the grommets 20 when positioned in the holes 19 will be flush with that surface.

In accordance with known techniques, the magnetized grommet 20 comprises a polymeric resin material such as a polyester or polyurethane with a magnetic filler material such as barium ferrite interspersed in the resin during the molding process. The magnetic filler material may be magnetized either during the molding process to produce a relatively high energy magnet or after the molding process to produce a relatively lower energy magnet. While high energy magnets may be desirable in some situations, it is believed that low energy magnets will suffice in most cases resulting in less expensive equipment being required to mold the magnetized grommets 20.

The size and quantity of magnetic grommets 20 required will vary depending upon the size, shape and weight of the articles being conveyed. In the present embodiment a variety of magnetic grommets 20 can be stocked and selectively supplied with the base chain links 10 according to the requirements of a particular conveying application.

Figure 3:
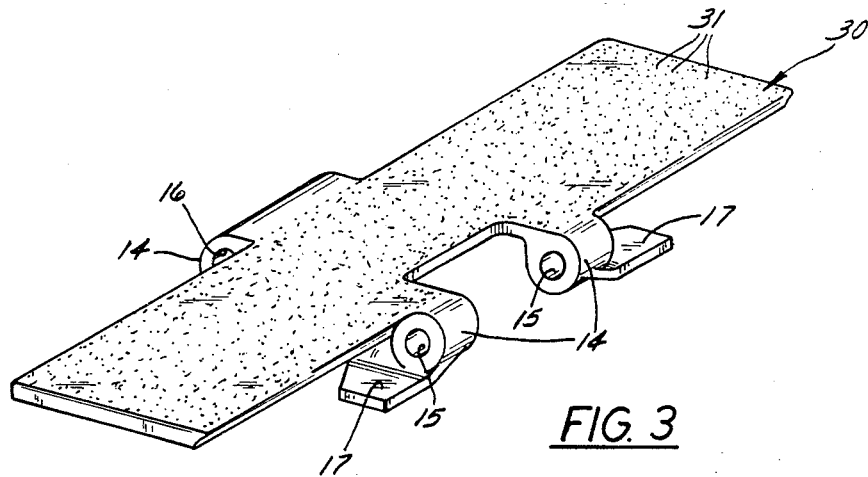

It should be apparent that the particular shape of the magnetized grommets 20 may vary without departing from the scope of the present invention. For example, the link can be magnetized over its entire surface, or substantial sections of its surface. One embodiment of such a link utilizes magnetized steel and is made according to the design of FIG. 3. Similarly, the present embodiment can also be used with nonmetallic chain links with the magnetic filler material 31 interspersed throughout the link 30 as shown in FIG. 3 rather than using grommets 20.

In this embodiment of the invention, the magnetic filler material 31 is added to the polymeric resin during the conventional molding process of the link 30. Again, the filler material may be magnetized during or after the link 30 is molded resulting in different magnetic strengths of the molded links 30. Preferably the link 30 is magnetized to provide multiple poles therein. The maximum field thus produced allows a minimum amount of filler material 31 to be used thereby reducing the reduction of strength of the links caused by adding the filler 31. Having thus provided the chain links 10, 30 according to the present invention, the links 10, 30 may be assembled to provide a conveyor for ferro magnetic articles. Instead of being made of a polymer with magnetic fillers, the link 30 shown in FIG. 3 could be made of magnetized steel.

Figure 4:
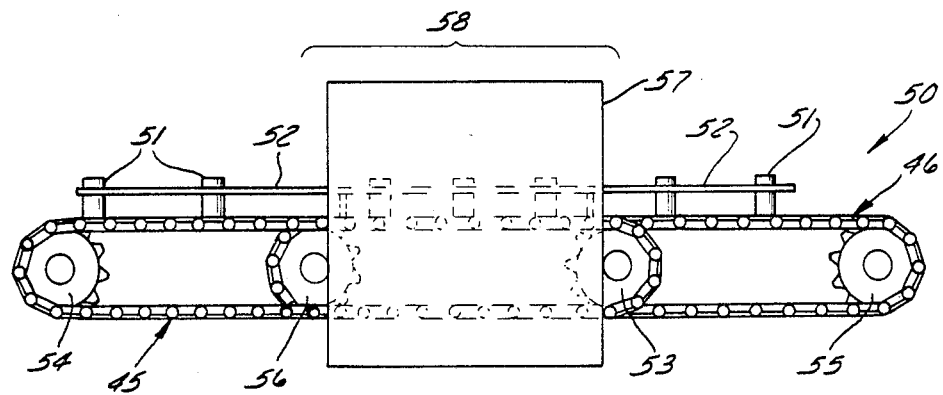
Figure 5:
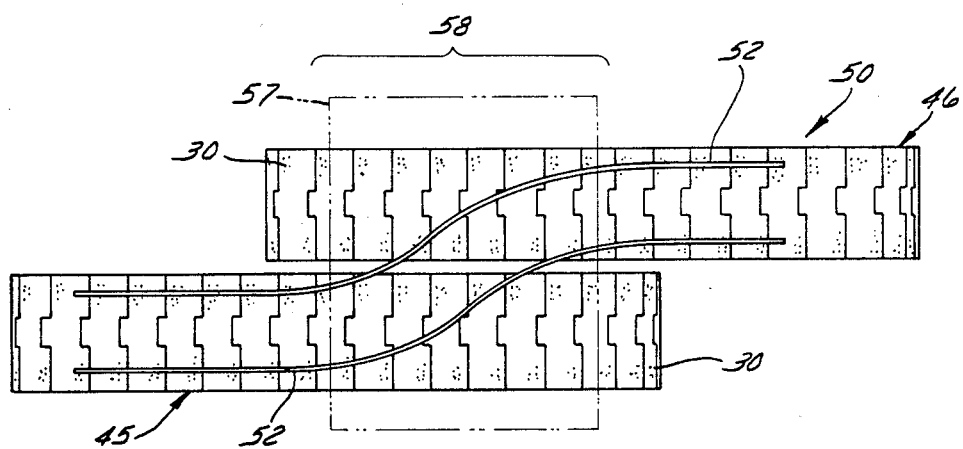

As shown in FIGS. 4 and 5 a conveyor 50 comprising a plurality of interconnected chain links 10, 30 in conveying ferro magnetic articles 51 such as metal containers. The conveyor shown includes a transfer area 58 where articles 51 are guided from a first section of conveyor 45 to a second 46 by guide rails 52. A first set of two sprockets 53, 54 provides the drive means for the first conveyor section while a second set of two sprockets 55, 56 provides the drive means for the second conveyor section. At an intermediate overlapping area of the two conveyor sections guide rails 52 are provided to transfer the articles 51. As previously stated, neutralization of the magnetic field is normally not required to transfer the products 51.

The transfer of articles 51 may be eased by neutralizing the magnetic attraction of the chain links 10, 30 at the transfer area 58. Those same links will then regain their magnetic attraction after they pass the transfer area. The neutralizing is accomplished by providing a magnetizing coil 57 at the transfer area 58.

As shown in the drawing a neutralizing coil 57 is positioned in the first conveyor section 45 before the transfer area 58. This coil 57 is electrically connected to produce a magnetic field having a polarity opposite to that of the magnetized chain links 10, 30 as they pass through the coil 57. The coil 57 has a neutralizing effect on the magnetic field of the links 10, 30 thereby allowing the conveyed articles 51 to more easily transfer from the first 45 to second 46 conveyor section. The links 10, 30 then regain their magnetic attraction after passing the transfer area 58.

Figure 6:
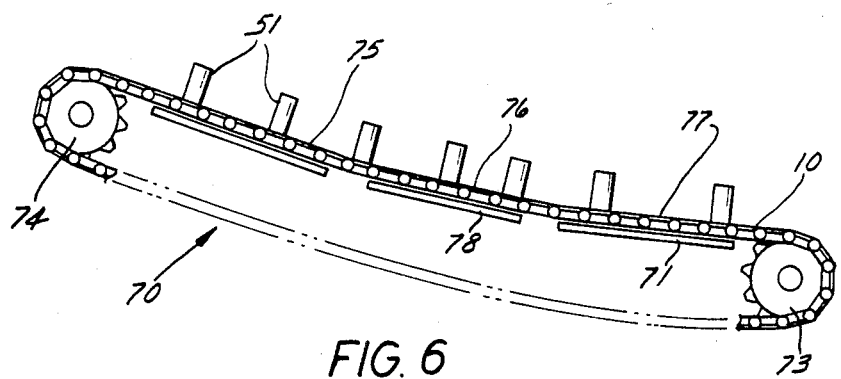

Referring now to FIG. 6, there is shown an inclined conveyor section 70 employing chain links 10, 30 constructed according to the principles of the present invention. The chain links 10, 30 are supported by and travel on nonmetallic low friction wear strips 71 and are driven in a conventional manner by a set of sprockets 73, 74.

As the conveyed articles 51 proceed along with the magnetized links 10, 30 of the conveyor 70 the inclined portion 75 is encountered. At the transition point 76 experience has demonstrated that the conveyor chain links 10, 30 tend to raise up from the wear strips 71. In accordance with the principles of the present invention this tendency can be counteracted by providing a ferro magnetic portion of wear strip 78 at the transition section of the conveyor between the horizontal 77 and inclined 75 portions of the conveyor 70. The attraction between the magnetized chain links 10, 30 and the ferro magnetic wear strips 78 counteracts the tendency of the conveyor chain to raise.

Figure 7:
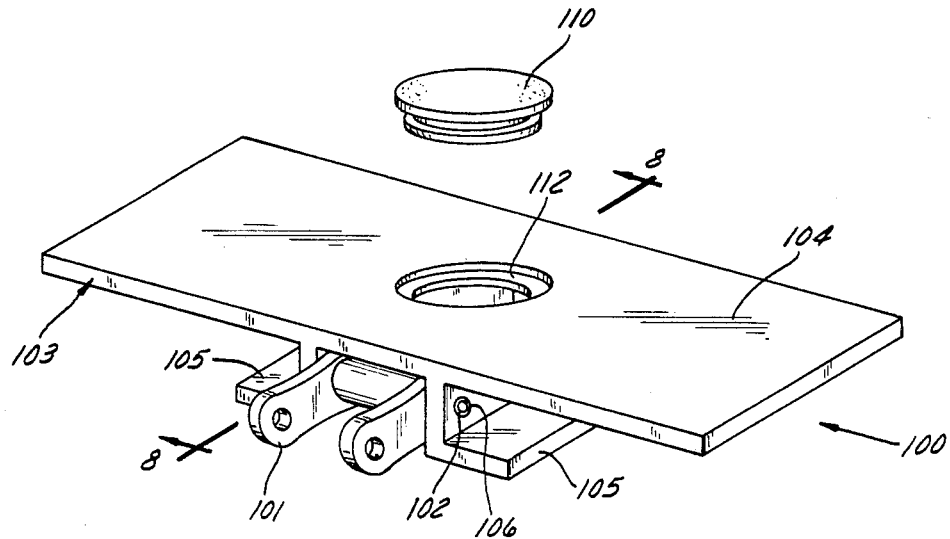
Figure 8:
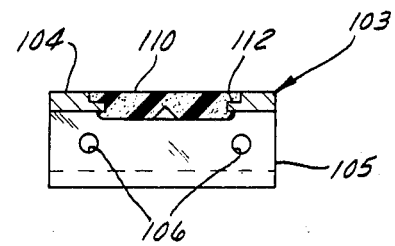
Figure 9:
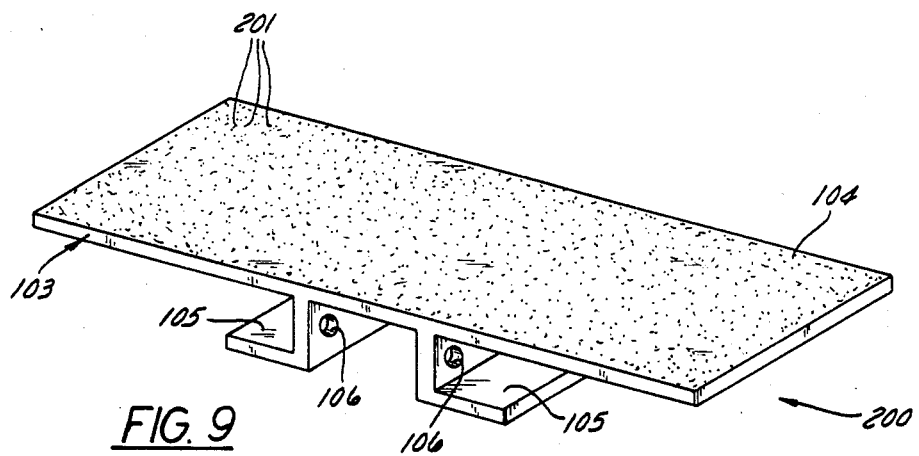

In another embodiment of the present invention shown in FIGS. 7-9, a plate top conveyor chain 100 comprises a conventional roller chain 101 including some extended chain pins 102. The plate top attachment 103 includes an article carrying portion 104 with depending legs 105 having holes 106 therein for receiving the extended portions 102 of the pins thereby connecting the attachment 103 to the roller chain 101. As previously described, the article carrying portion 104 may include either a magnetized grommet 110 which fits into a hole 112 in the attachment 103 or in the case of a nonmetallic attachment 200 as shown in FIG. 9, there may be a magnetic filler material 201 dispersed throughout the nonmetallic resin to impart magnetic properties to the attachment 200. In operation this embodiment of the plate top conveyor chain is identical to the conveyors previously described except that the conveyor is driven by sprockets designed for roller chain.

I claim:

1. A chain link, comprising:
   a substantially flat article carrying portion having at least one aperture therein;
   two legs integrally depending from said article carrying portion, each of said legs having a hole therein for insertion of a pin;
   a flexible magnetic grommet positioned in said aperture for attracting ferro magnetic articles, including a substantially flat top portion, a small-diameter central portion, and a tab portion, wherein said top and tab portions have a larger outside diameter than the smallest internal diameter of said aperture, such that said grommet may be inserted into said aperture by deforming said tab portion until it passes through the smallest internal diameter of said aperture so that said grommet may be retained in said aperture by the larger diameter tab and top portions.

2. A chain link as recited in claim 1, wherein said grommet is made of a polymeric material with magnetic fillers dispersed therein.

3. A chain link as recited in claim 2, wherein said aperture has a varying internal diameter.

* * * * *